United States Patent [19]
Consiglio et al.

[11] Patent Number: 5,461,670
[45] Date of Patent: Oct. 24, 1995

[54] TELEPHONE SUBSCRIBER SYSTEM INCORPORATING A DRIVE INTERFACE FOR A TELEPHONE LINE SWITCH AT A DIFFERENT REFERENCE POTENTIAL

[75] Inventors: Pietro Consiglio, Milan; Carlo Antonini, Varese; Gianpietro Vanalli, Bergamo, all of Italy

[73] Assignee: SGS-Thomson Microelectronics, s.r.l., Milan, Italy

[21] Appl. No.: 176,127

[22] Filed: Dec. 30, 1993

[30] Foreign Application Priority Data

Dec. 30, 1992 [EP] European Pat. Off. .............. 92830693

[51] Int. Cl.$^6$ .................................................. H04M 1/00
[52] U.S. Cl. ........................... 379/387; 379/187; 379/398; 379/418; 379/180
[58] Field of Search ...................................... 379/387, 180, 379/187, 398, 418

[56] References Cited

FOREIGN PATENT DOCUMENTS

0436445A1  7/1991  European Pat. Off. ......... H04M 1/00
0508882A1  4/1992  European Pat. Off. ......... H04M 1/00

OTHER PUBLICATIONS

Nguyen, C.; Consiglio, P.; Adducci, F.; Vanalli, G. P. "A Single Chip BiMOS Telephone Set," *IEEE International Solid-State Circuits Conference* 32: 254–255 & 356, 1989.

Consiglio, P.; Clerici, G. C.; Vanalli, G. P. "A Single–Chip Telephone Line Interface in BCD Technology," *IEEE International Solid–State Circuits Conference* 35: 220–221 & 289.

*Primary Examiner*—James L. Dwyer
*Assistant Examiner*—Jacques M. Saint-Surin
*Attorney, Agent, or Firm*—David V. Carlson; Clarence T. Tegreene; Seed and Berry

[57] ABSTRACT

A telephone subscriber system comprising a speech circuit and a ring circuit adapted to be integrated monolithically to a semiconductor material substrate and being coupled to a telephone subscriber line, respectively through first and second circuit switch of the diode bridge type, further comprises a first circuit changeover switch, under control by the user, which drives at least second and third circuit switching means connected between the first diode bridge circuit and the speech circuit. The third circuit changeover switch is connected to the speech and ring circuits at a circuit communication node which forms the system point of reference, physically coincident with the substrate. The system includes a circuit interface means for controlling the second and third circuit changeover switch by external electrical signals which are related to the circuit communication node. The circuit interface circuit comprises a diode connected with its cathode to the circuit communication node, in parallel with the third circuit changeover switch.

19 Claims, 2 Drawing Sheets 5,461,670

TELEPHONE SUBSCRIBER SYSTEM INCORPORATING A DRIVE INTERFACE FOR A TELEPHONE LINE SWITCH AT A DIFFERENT REFERENCE POTENTIAL

FIELD OF THE INVENTION

This invention relates to telephone devices for subscriber systems, in particular telephone subscriber devices adapted to be monolithically integrated.

BACKGROUND OF THE INVENTION

In telephone circuits of the one-chip type which serve multiple functions normally performed by discrete integrated circuits such as modem speech, ring, and tone circuits—the system common point of reference, both physically and electrically, is an individual one coinciding with the substrate of semiconductor material whereto the whole one-chip circuit is integrated.

In a telephone subscriber system, the telephone subscriber speech circuit and ring circuit are both coupled to, and energized through, the telephone line. During the ring phase, however, any coupling of the two circuits together must be prevented, as by disconnecting the speech circuit through switches, whereas during the speech phase, the ring circuit must be disabled. Current telephone company standards, moreover, call for the ring circuit to be DC uncoupled from the telephone line for any line polarity. This requires, as is well recognized by the skilled ones in the art, either the provision of a dual RC network, or the inclusion of a traditional electric switch which can be readily integrated. Understandably, the last-mentioned solution is the one which would normally be utilized wherever the telephone circuits involved are of the one-chip type.

In a telephone subscriber system, the speech phase is initiated by connecting the telephone line (DC connection) to the telephone subscriber speech circuit as the handset is picked up or, in more sophisticated designs, on a pulse being issued from a keyboard. But, if one wishes to connect the line to the telephone subscriber speech circuit without picking up the handset and without acting physically on the telephone apparatus as by keying in—operation from an external electric control being preferred instead—problems may arise from the line polarity being undefined and the line's own reference potential being other than the reference potential of the one-chip circuit, i.e., its substrate. In fact, an input terminal of the device—namely that connected to the terminal of the polarity bridge, which would usually be a diode bridge enabling the speech circuit to be coupled to the line—might take a negative potential with respect to the system reference, i.e., the device substrate.

To obviate the difficulties brought about by the different electrical references, it has been common practice to employ in most cases either electromechanical devices or opto-electronic components, which are effective but cost-intensive.

SUMMARY OF THE INVENTION

The underlying technical problem of this invention is to provide a telephone subscriber system with a monolithically integrated line switch, for driving by external electrical signals, which can enable the speech circuit even under a condition of differing telephone line and subscriber system reference potentials.

This problem is solved by a telephone subscriber system having a circuit interface means connected to a common reference potential driving a pair of switches, where the circuit interface means includes a unidirectional current flow circuit element to control drive currents produced in the circuit interface means.

The features and advantages of a telephone subscriber system according to the invention can be appreciated from the following description of an embodiment thereof, to be taken by way of example and not of limitation in conjunction with the accompanying drawings.

DETAILED DESCRIPTION OF THE INVENTION

Figure 1:
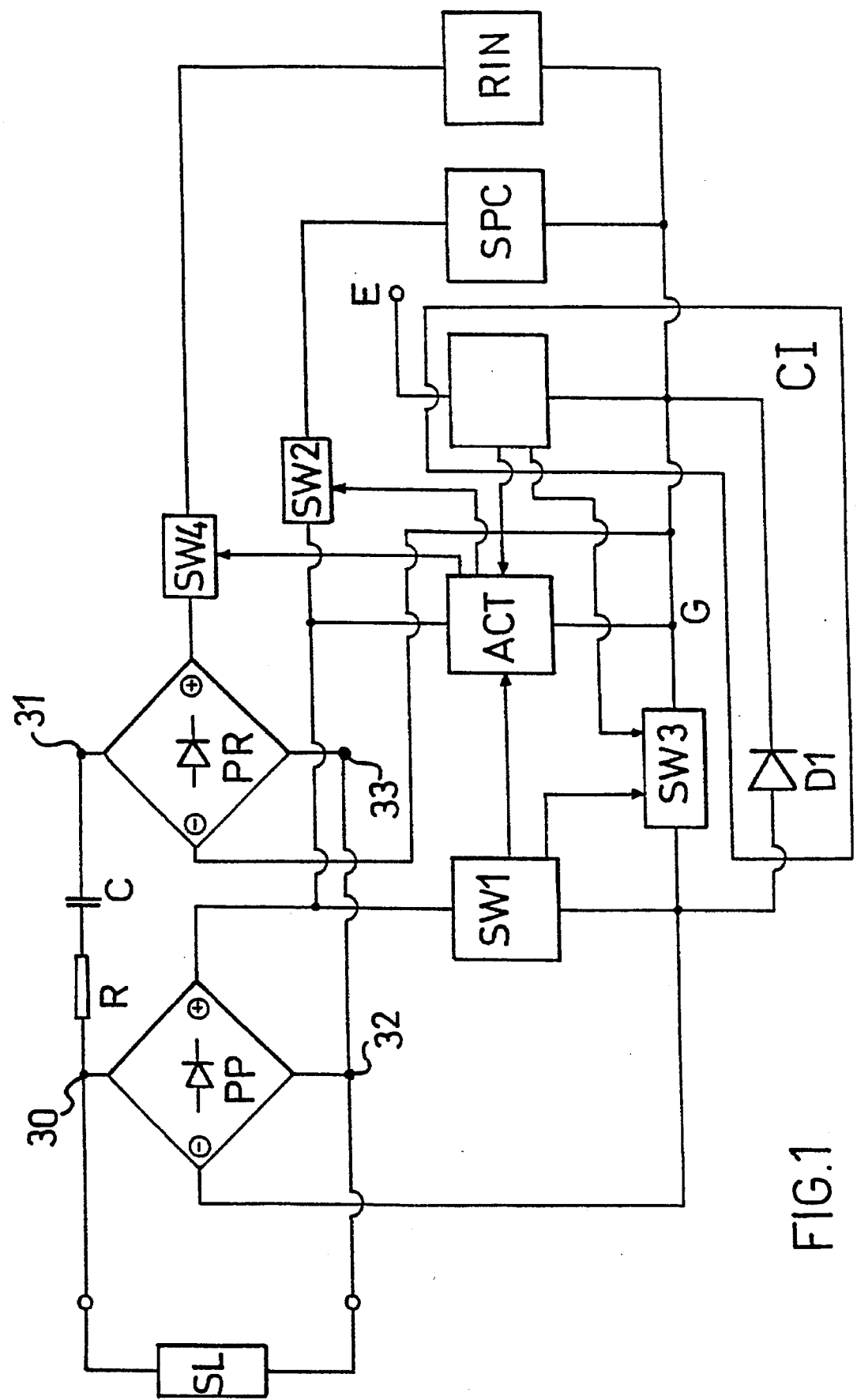
FIG. 1 is a circuit diagram, partly in block form, of a telephone subscriber system according to the invention.

The circuit illustrated by the diagram in FIG. 1 comprises first diode bridge PP, and second diode bridge PR adapted to respectively couple a speech circuit SPC and a ring circuit RIN to a telephone subscriber line represented by a block SL. Each bridge circuit has a respective first terminal 30, 31 and second terminal 32, 33 for coupling to the line. The second bridge circuit PR is, however, DC uncoupled from the line by means of a resistor R and a capacitor C. The second bridge circuit PR functions as a rectifying bridge for the ring signals, whereby the ring circuit is activated to operate the bell of the subscriber set. On the other hand, the bridge circuit PP functions to maintain, on its two output terminals ("+" and "−") 34, 36 thereof for coupling to the speech circuit, a predetermined polarity irrespective of the line polarity.

Connected across the two output terminals 34, 36 is a first circuit switching means, SW1, adapted to be actuated by the user picking up the handset or causing a pulse to be issued from a keyboard. The first circuit switching means SW1 drives two more circuit switching means, SW2 and SW3, whereby the speech circuit SPC is coupled, over a terminal pair, to the "+" and "−" terminals 34, 36 of the bridge circuit PP. The above three changeover circuit means SW1, SW2, SW3 act as switches effective to disconnect the speech circuit SPC from the subscriber line SL during the ring phase.

A fourth circuit switching means, SW4, driven by SW1 acts as a switch effective to disable the ring circuit RIN by breaking the connection between the ring circuit RIN and the second bridge circuit PR upon the first circuit switching means SW1 activating the second and third circuit switching means SW2 and SW3 and accordingly enabling the speech circuit. The circuit switching means SW1, SW2, SW3 and SW4 are implemented as MOS transistors in the preferred embodiment. Alternatively, other implementations, such as bipolar junction transistors may be used where appropriate.

Also shown in FIG. 1 is an actuator circuit represented by a block ACT. The actuator circuit ACT comprises the required circuit parts to actually control the circuit switching means SW2, and is connected between the "+" terminal 36 of the first bridge circuit PP and a circuit communication node G establishing a link between the speech circuit SPC, the ring circuit RIN and the third circuit switching means SW3. The actuator circuit ATC is a known circuit that is publicly available to those of ordinary skill in the art. The actuator circuit ATC provides the signals for driving the switching means SW2, and SW4 to allow the use of the telephone device during the speech or ring phases. The input signal of the actuator ACT is supplied by the switching means SW1 when picking up the telephone handset or touching a key on the keyboard. The driving command on the switching means SW2, SW4 is running only if the third switching means SW3 has been previously activated. Any suitable circuit that is presently well known is acceptable; of the many acceptable circuits, one known circuit is presented in FIG. 12 of the published data manual for commercially available products TDE 1747-TDF 1747 from SGS Microelectronics.

For telephone devices of the one-chip type, said circuit communication node G is a representation circuit-wise of the semiconductor material substrate, whereto the speech circuit SPC and ring circuit RIN are integrated monolithically, constituting the reference potential for the telephone subscriber system.

Unlike the third circuit switching means SW3, which is also connected to the circuit communication node G, the circuit switching means SW2 is connected to no reference potential and, therefore, it is convenient to provide, with current circuit techniques, an actuator circuit ACT having as its reference potential that of the substrate of the single chip represented as node G.

In accordance with this invention, the circuit in FIG. 1 comprises a circuit interface means CI having an input terminal E for the application of external electrical signals in relation to the circuit node G, and output terminals for driving the second circuit switching means SW2 through the actuator circuit ACT, as well as driving the third circuit switching means SW3 directly.

An essential feature of the invention is that such circuit interface means CI include a circuit unidirectional current flow element, shown as a diode D1, connected, in parallel with the third circuit switching means SW3, between the "–" terminal 34 of the bridge circuit PP and the circuit node G.

In a telephone subscriber system according to the invention, an external electrical command referenced to the substrate potential and the operation of the high-voltage electronic switch SW3 referenced to the negative potential of the polarity bridge circuit PP are properly interfaced in quite a simple manner which may be realized in a fully integrated form. The operation of switch SW3 is enabled by the provision of diode D1 between the bridge circuit PP and the substrate. The drive currents produced in the interface circuit CI by the external electrical command flows to the substrate, via the diode DI, under any polarity conditions.

Figure 2:
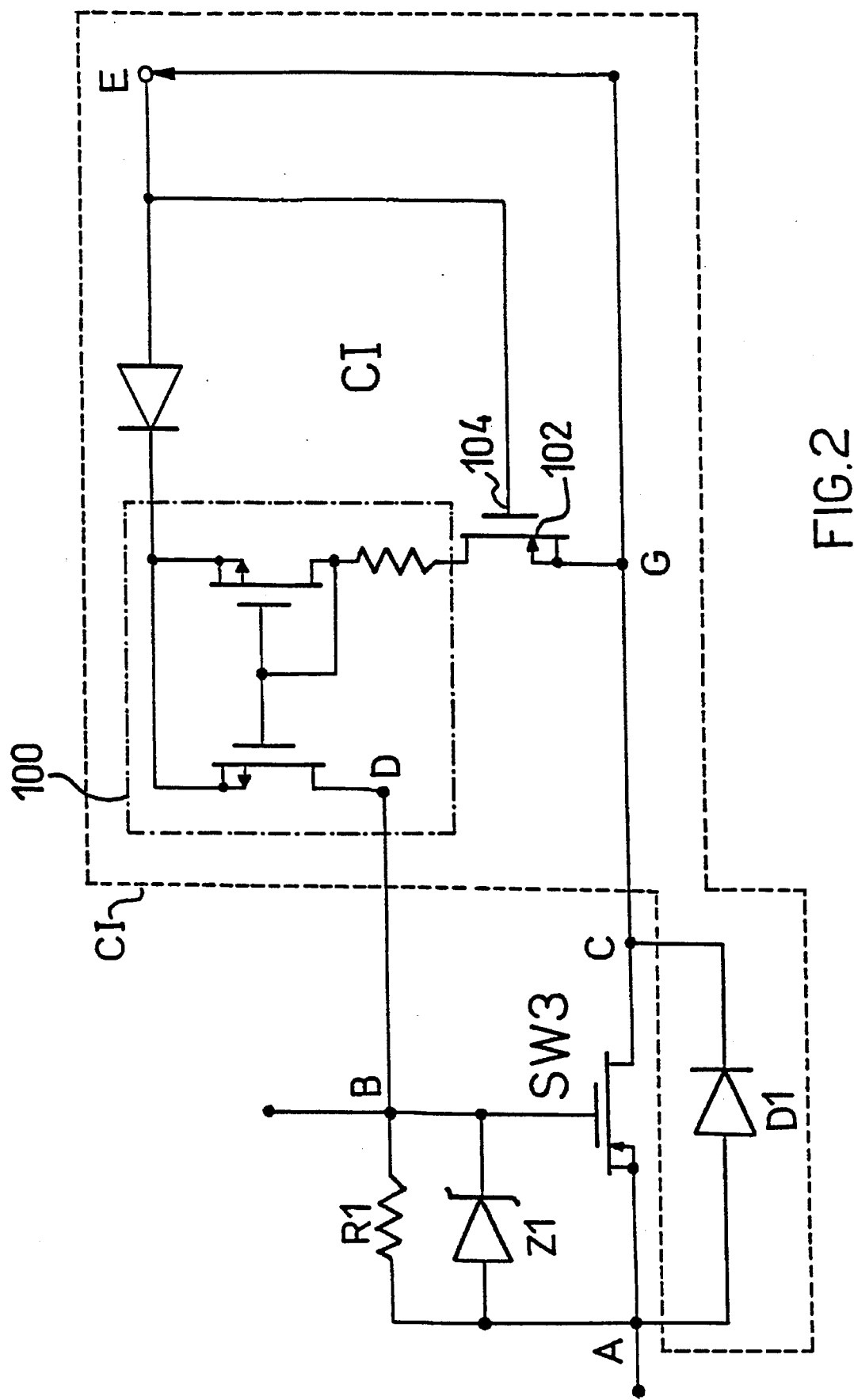
FIG. 2 is a circuit diagram of a possible embodiment of a circuit interface means portion of the telephone subscriber system of FIG. 1.

The electronic switch SW3 may be implemented, in a known manner to those skilled in the art, using a single NPN transistor in a Darlington configuration, or alternatively, a transistor of the MOS type, depending on the integration technology employed. Shown in FIG. 2 is a preferred embodiment of the electronic switch SW3 and the interface circuit CI for driving by external electrical commands related to the system common node G. The switch SW3 is implemented by an N-channel DMOS component, and the interface circuit CI is also made up of components of the MOS type. Of course, bipolar components would be employed in embodiments incorporating a bipolar type of electronic switch.

FIG. 2 shows a resistor R1 and a Zener diode Z1 connected across terminals A and B of the switch SW3; the resistor R1 ensures that the electronic switch SW3 is normally open when no commands (by picking up the handset or keying in) are applied to the terminal B, whilst the Zener diode Z1 between the gate and the source of the N-channel DMOS transistor functions as a gate voltage protection.

The interface circuit CI comprises a current generator consisting of a current mirror circuit 100 whose output leg D drives both the actuator circuit ACT and the electronic switch SW3 through terminal B. Provided between the input leg of the current mirror circuit 100 and the system communication node G is a MOS transistor 102 whose gate terminal 104 is connected, via a diode 106, to the current mirror circuit 100 as well as to the input terminal E to which external electrical commands referenced to the common node G, i.e., the substrate, can be applied. In this embodiment, a diffusion of the P type is "seen" at the output D of the interface circuit CI. This is important because whenever line polarity conditions are encountered, in the absence of any command, whereby the potential at point A is lower than that at point G—which is the system common point (substrate)—the junction is reverse biased with respect to the substrate and, therefore, the telephone set isolation resistance kept high. The output current flows into R1 from point D, and loops to the substrate through the diode D1. The voltage drop across R1 drives the transistor of switch SW3 into conduction, and allows current to flow between the "+" and "–" terminals 34, 36 of the bridge circuit PP. The voltage drop across resistor R1 also causes, the switch SW2 to conduct, through the actuator circuit, thereby enabling the speech circuit SPC and the single chip as a whole to be energized and operated.

The operability of the telephone circuit connected to the line can thus be enabled by means of electrical commands which have for their reference the system common point G and may be supplied, for example, from an automatic answering set, as connected or incorporated to the telephone subscriber system. It should be noted that the diode D1 is intrinsic to the monolithically integrated N-channel DMOS component, so that this embodiment of the invention, in addition to being uniquely reliable, is far less expensive than prior art solutions.

We claim:

1. A telephone subscriber system, comprising at least:

one speech circuit having at least first and second terminals;

a telephone ring signal detection circuit having at least first and second terminals;

a first circuit means in bridge form having first and second terminals for coupling to a telephone subscriber line and third and fourth terminals for coupling to the first and the second terminals, respectively, of the speech circuit;

a second circuit means in bridge form having first and second terminals for coupling to the line through at least one DC uncoupling circuit means and third and fourth terminals for coupling to the first and the second terminals of the ring signal detection circuit; and a first circuit switching means connected between the third and the fourth terminals of the first bridge circuit means and adapted to be controlled through an input terminal actuated by the user and to drive at least second and third circuit switching means, respectively connected between the third terminal of the first bridge circuit means and the first terminal of the speech circuit, and between the fourth terminal of the first bridge circuit means and a circuit connection node whereto the fourth terminal of the second bridge circuit means, the second terminal of the speech circuit and the second terminal of the ring signal detection circuit are connected, characterized in that it comprises:

a circuit interface means connected to the circuit connection node and operative to drive at least the second and third circuit switching means;

said circuit interface means including at least one unidirectional current flow circuit element connected between the fourth terminal of the first bridge circuit means and the circuit connection node.

2. A telephone subscriber system according to claim 1, wherein the circuit interface means comprises;

a current mirror circuit having an input leg connected to the circuit communication node through a second transistor and an output leg coupled to the control terminal of the first transistor and the second circuit switching means, the second transistor having a control terminal for coupling to a signal source.

3. A telephone subscriber system according to claim 1, wherein the unidirectional current flow circuit element comprises a diode having its cathode connected to the circuit communication node.

4. A telephone subscriber system according to claim 3, wherein the circuit interface means comprises a current mirror circuit having an input leg connected to the circuit communication node through a second transistor and an output leg coupled to the control terminal of the first transistor and the second switching means, the second transistor having a control terminal for coupling to a signal source.

5. A telephone subscriber system according to claim 1, wherein the third circuit switching means comprises a first transistor having a first terminal connected to the circuit connection node, the second terminal connected to the fourth terminal of the first bridge circuit means, and a control terminal connected to a first circuit switching means, characterized in that the unidirectional current flow circuit element is connected between the first and the second terminals of the first transistor.

6. A telephone subscriber system according to claim 5, wherein the circuit interface means comprises a current mirror circuit having an input branch connected to the circuit communication node through a second transistor and an output leg coupled to the control terminal of the first transistor and the second circuit switching means, the second transistor having a control terminal for coupling to a signal source.

7. A telephone subscriber system according to claim 5, wherein the unidirectional current flow circuit element comprises a diode having its cathode connected to the circuit communication node.

8. A telephone subscriber system according to claim 7, wherein the circuit interface means comprises a current mirror circuit having an input leg connected to the circuit communication node through a second transistor and an output leg coupled to the control terminal of the first transistor and the second circuit switching means, the second transistor having a control terminal for coupling to a signal source.

9. A telephone subscriber system according to any one of the preceding claims, comprising an actuator circuit for controlling at least the second circuit switching means, said actuator circuit being connected between the third terminal of the first bridge circuit means and the circuit communication node, as well as between the first circuit switching means, the circuit interface means and the second circuit switching means.

10. A telephone subscriber system according to claim 1, wherein at least the speech and ring circuits are integrated monolithically to a semiconductor material substrate, characterized in that said substrate is the circuit communication node, the first transistor is an n-channel D-MOS type and the diode is a diode intrinsic to the integrated structure of said first transistor.

11. An apparatus for use in a telephone subscriber system comprising:

a pair of subscriber line terminals;

a diode bridge having four terminals, the first and second of said terminals connected to the subscriber line terminals;

a second diode bridge having four terminals, the first of said terminals connected to the first subscriber line terminals and the second of said terminals connected, through an isolation circuit to the second of said terminals;

a user activated first switch having four terminals, the first and second of said terminals connected to the third and fourth terminals of said first diode bridge;

a second switch connected between the third terminal of said first diode bridge and a speech circuit terminal;

a third switch connected electrically between the first terminal of said first diode bridge and a circuit communication node;

a fourth switch connected between the third terminal of said second diode bridge and a ring circuit terminal, said output terminal connected to the common reference and said command terminal connected to the user activated switch;

an actuator having four input terminals and two output terminals, the first of said input terminals connected to said third terminal of said first diode bridge, said second terminal connected to the circuit communication node, the third input terminal connected to the user activated switch, the first output terminal connected to operate the second switch and the second output terminal connected to operate the fourth switch; and a circuit interface having two output terminals, an external command terminal and a reference terminal, the reference terminal connected to the circuit communication node, the first output terminal connected to the second input terminal of the actuator and the second output terminal connected to the command terminal of the third switch the circuit interface means including a first diode connected between the first terminal of the first diode bride and the circuit communication node.

12. The device of claim 11 wherein the circuit interface further comprises a circuit interface transistor having its input terminal connected to said external command terminal, and a current mirror having an input terminal and two output legs, said input terminal connected to the second terminal of said first diode, the first output leg connected to a second terminal of said circuit interface transistor and said second output leg connected to actuate said third switch.

13. The device of claim 12 wherein said circuit interface transistor is a DMOS transistor and the input terminal of said DMOS transistor is its gate terminal.

14. The apparatus of claim 11 wherein the third switch is an N-channel DMOS transistor.

15. The device of claim 14, further comprising a resistor and a diode connected between the gate of said N-channel DMOS transistor and the source of said N-channel DMOS transistor.

16. The device of claim 14, further comprising a diode connected between the source of said N-channel DMOS transistor and the circuit communication node.

17. The device of claim 16 wherein said N-channel DMOS transistor is monolithically integrated, said diode being intrinsic to said N-channel DMOS transistor.

18. The apparatus of claim 12 wherein the third switch is a single NPN transistor.

19. A monolithically integrated circuit for use in a telephone subscriber system comprising:

a user actuated first switch operative to actuate a second switch, a third switch and a fourth switch;

a circuit interface means having an external command input referenced to a substitute potential, said circuit interface means operative to actuate the second switch, the third switch and the fourth switch;

a first diode bridge connected between a pair of subscriber line terminals and a pair of speech circuit terminals, said connection enabled by actuation of the fourth switch;

a second diode bridge connected between the pair of subscriber line terminals and a pair of ring circuit terminals, said connection enabled by actuation of the second switch, said second diode bridge being DC uncoupled from the first of the subscriber line terminals; and a diode connected in parallel with the third switch.

* * * * *